(12) United States Patent
Jendick

(10) Patent No.: US 6,455,806 B1
(45) Date of Patent: Sep. 24, 2002

(54) ARRANGEMENT FOR SHAPING AND MARKING A TARGET

(75) Inventor: Manfred Jendick, Recklinghausen (DE)

(73) Assignee: Rexam AB, Malmo (SE)

( * ) Notice: Subject to any disclaimer, the term of this patent is extended or adjusted under 35 U.S.C. 154(b) by 71 days.

(21) Appl. No.: 09/722,385

(22) Filed: Nov. 28, 2000

Related U.S. Application Data

(60) Provisional application No. 60/176,012, filed on Jan. 14, 2000.

(51) Int. Cl.[7] .............................................. B23K 26/08
(52) U.S. Cl. ................................. 219/121.68; 219/121.4
(58) Field of Search ....................... 219/121.76, 121.77, 219/121.36, 121.37, 121.38, 121.39, 121.4, 121.44, 121.6, 121.63, 121.64, 121.65, 121.66, 121.67, 121.68, 121.69, 121.7, 121.72, 121.73, 121.71

(56) References Cited

U.S. PATENT DOCUMENTS

| | | |
|---|---|---|
| 2,641,998 A | 6/1953 | Donald |
| 2,648,278 A | 8/1953 | Neander |
| 3,001,787 A | 9/1961 | Socke |
| 3,182,994 A | 5/1965 | Huth |
| 3,549,733 A | 12/1970 | Caddell |
| 3,626,141 A | 12/1971 | Daly |
| 3,692,223 A | 9/1972 | Laigle et al. |
| 3,854,647 A | 12/1974 | Mittendorf |
| 3,858,122 A * | 12/1974 | Angelbeck et al. ......... 359/337 |
| 3,863,823 A | 2/1975 | Allred |
| 3,898,417 A | 8/1975 | Atkinson |
| 4,304,981 A | 12/1981 | Gappa |
| 4,322,016 A | 3/1982 | Barrash |
| 4,323,755 A | 4/1982 | Nierenberg |
| 4,363,179 A | 12/1982 | Ruemer, Jr. et al. |
| 4,375,025 A | 2/1983 | Carlson |

(List continued on next page.)

FOREIGN PATENT DOCUMENTS

| | | |
|---|---|---|
| CA | 2168435 | 2/1995 |
| CA | 2232871 | 3/1997 |
| DE | 2052 512 | 4/1972 |
| DE | 89 00 453 1 | 4/1989 |
| DE | 38 22 097 A1 | 1/1990 |
| DE | 4106151 | 11/1991 |
| DE | 4143339 | 3/1993 |
| DE | 43 39 321 A1 | 6/1994 |

(List continued on next page.)

OTHER PUBLICATIONS

Brochure entitled, "This is PLM Foise," issued by Swedish Company, PLM Foise AB (mid 1990's).

JP 07004675, Patent Abstracts of Japan (CD–ROM), Unexamined Applications, vol. 95, No. 1 Jan. 10, 1995, Nakajima.

(List continued on next page.)

*Primary Examiner*—Tom Dunn
*Assistant Examiner*—Jonathan Johnson
(74) *Attorney, Agent, or Firm*—Pillsbury Winthrop LLP

(57) ABSTRACT

An arrangement for shaping and marking a target includes a processing apparatus that is configured to mechanically shape the target, a marking unit that is arranged to non-mechanically provide markings on the target in a marking area adjacent to the processing apparatus, and a supporting unit that supports the marking unit. The supporting unit is slidable between a first position in which the marking unit is aligned with the marking area for effecting a high-precision marking operation and a second position in which the marking and supporting units are spaced from the marking area and the processing apparatus to provide immediate and complete access to the marking unit and processing apparatus for maintenance or the like.

20 Claims, 4 Drawing Sheets

U.S. PATENT DOCUMENTS

| | | | |
|---|---|---|---|
| 4,380,129 A | | 4/1983 | Barrash |
| 4,405,852 A | | 9/1983 | Bononi |
| 4,431,124 A | | 2/1984 | Campbell et al. |
| 4,459,910 A | | 7/1984 | Taube |
| 4,476,781 A | | 10/1984 | Kubacki et al. |
| 4,517,436 A | | 5/1985 | Lawerence |
| 4,517,638 A | * | 5/1985 | Provisor et al. ............ 271/3.14 |
| 4,564,739 A | | 1/1986 | Mattelin |
| 4,635,545 A | | 1/1987 | Kubacki |
| 4,675,500 A | | 6/1987 | Kunz |
| 4,765,532 A | | 8/1988 | Uomoti et al. |
| 4,880,137 A | | 11/1989 | Wells |
| 4,910,739 A | | 3/1990 | Sheng |
| 4,940,880 A | * | 7/1990 | Klingel et al. ......... 219/121.67 |
| 5,202,199 A | | 4/1993 | Mitzutani |
| 5,206,496 A | | 4/1993 | Clement et al. |
| 5,215,864 A | | 6/1993 | Laakmann |
| 5,235,454 A | | 8/1993 | Iwasaki |
| 5,248,878 A | | 9/1993 | Ihara |
| 5,329,090 A | | 7/1994 | Woelki et al. |
| 5,465,780 A | | 11/1995 | Muntner et al. |
| 5,552,574 A | | 9/1996 | Merlin |
| 5,570,384 A | | 10/1996 | Nishida et al. |
| 5,578,120 A | | 11/1996 | Takahashi et al. |
| 5,593,606 A | | 1/1997 | Owen et al. |
| 5,649,363 A | | 7/1997 | Rankin, VI |
| 5,653,900 A | | 8/1997 | Clement et al. |
| 5,660,516 A | | 8/1997 | Artrip |
| 5,660,747 A | | 8/1997 | Drouillard et al. |
| 5,719,372 A | | 2/1998 | Togari et al. |
| 5,782,024 A | | 7/1998 | Pausch |
| 5,817,243 A | | 10/1998 | Shaffer |
| 5,854,805 A | | 12/1998 | Reid |
| 5,863,017 A | * | 1/1999 | Larson et al. ............ 248/176.1 |
| 6,002,098 A | | 12/1999 | Pircher et al. |
| 6,080,958 A | | 6/2000 | Miller et al. |
| 6,111,907 A | * | 8/2000 | Ozarski ..................... 372/107 |
| 6,140,606 A | * | 10/2000 | Heikilla et al. .......... 219/121.6 |
| 6,326,586 B1 | * | 12/2001 | Heyerick et al. ...... 219/121.62 |

FOREIGN PATENT DOCUMENTS

| | | |
|---|---|---|
| DE | 4339321 | 6/1994 |
| DE | 4322252 | 1/1995 |
| DE | 44 35 531 A1 | 4/1995 |
| DE | 43 38 774 A1 | 5/1995 |
| DE | 44 05 203 A1 | 8/1995 |
| DE | 196 39 619 A1 | 3/1997 |
| DE | 19607621 | 9/1997 |
| DE | 298 16 109 U1 | 11/1998 |
| EP | 0 040 929 | 12/1981 |
| EP | 0 085 484 A1 | 8/1983 |
| EP | 0377915 A2 | 7/1990 |
| EP | 0482776 | 4/1992 |
| EP | 208 175 B1 | 3/1993 |
| EP | 0 618 037 A1 | 10/1994 |
| GB | 218563 | 7/1987 |
| JP | 58-187091 | 11/1983 |
| JP | 61086305 | 5/1986 |
| JP | 7-53099 A | 2/1995 |
| JP | 8-53121 | 2/1996 |
| WO | WO 93/04943 | 3/1993 |
| WO | WO 93/08541 | 4/1993 |
| WO | WO 95/04342 | 2/1995 |
| WO | WO 97/11288 | 3/1997 |
| WO | WO 98/53949 | 12/1998 |
| WO | WO 99/09853 | 3/1999 |
| WO | WO 00/03832 | 1/2000 |

OTHER PUBLICATIONS

JP 07045111, Patent Abstracts of Japan (CD–ROM), Unexamined Applications, vol. 95, No. 2 Jul. 31, 1993, Kawakatsu.

JP 04091875, Patent Abstracts of Japan, Abstract of DE 4106151.

Patent Abstracts of Japan, vol. 8, No. 25, E–225 Abstract of JP 58–187091A Nov. 1, 1993 Yamamoto et al.

Abstract—JP 0080047784 AA Toshio Feb. 20, 1996.

Abstract—JP 0080053121 AA Kazuyoshi Feb. 27, 1996.

Abstract—AU 9481794 A Baker Sep. 21, 1995.

Culkin & Kugler, "Industrial Laser Processing", The Photonics Design & Applications Handbook, Book 3, $37^{th}$ International Edition, 1991, pp. H–216–227.

Dr. A.F.H. Kaplan, EuroLaser Academy, 1996/1997, Section "Laser Marking and Scribing", pp. 1–3, No date avail.

W.M. Steen, "Laser Material Processing", Second Edition, Chapter "6.17.Laser Marking", Springer Verlag, 1998, pp. 263–265, 271.

* cited by examiner

ARRANGEMENT FOR SHAPING AND MARKING A TARGET

This application claims benefit of provisional application No. 60/176,012 filed Jan. 14, 2000.

TECHNICAL FIELD

The present invention relates to an arrangement for shaping and marking a target. More specifically, the invention relates to an arrangement adapted to shape the target by mechanical processing and to provide markings on the target by non-mechanical processing.

BACKGROUND ART

In many situations, there is a need to provide indicative markings on a product, for example, traceability markings indicating the origin of the product, or promotional marks. Such indicative markings can be provided by non-mechanical, i.e. non-contact, marking techniques, such as laser engraving or ink jet printing. These non-contact techniques provide for flexibility in production and high production speeds. Often, the markings must be precisely located in a specific area of the product. To maintain a positional relationship between the markings and this specific area, the markings should be provided immediately before or after the processing step in which this area attains its final shape. Such a processing step could include stamping and/or punching of a target material to form an intermediate, or even a final product.

A conventional laser engraving system comprises a laser unit, which is fixedly mounted to a supporting unit and arranged to provide markings on a target in a marking area. This marking area is often, for reasons given above, located in the immediate vicinity of a processing apparatus. Normally, to eliminate any movements of the laser unit during the marking operation, the supporting unit is of heavy-weight construction and firmly secured to the ground by bolts or the like. In such an arrangement, when any adjustment or maintenance of the processing apparatus should be made, the laser unit and supporting unit must be disassembled and removed, and then reassembled again before restarting the processing apparatus. This is a time-consuming operation.

SUMMARY OF THE INVENTION

The object of the invention is to find a solution to the above described problems.

This object is achieved by an arrangement according to appended claim 1, preferred embodiments being defined in the dependent claims.

By making the supporting unit slidable between the two positions, the arrangement of the invention allows for accurate alignment of the marking unit with the marking area adjacent to the processing apparatus, during operation thereof, while also providing immediate and complete access to the marking unit and the processing apparatus since the marking and supporting units can be readily moved away from the processing apparatus. Thus, the time-consuming operation of disassembling the marking unit and the supporting unit, for example for maintenance, is eliminated.

The arrangement according to the invention is particularly useful in the manufacture of marked opening tabs to be attached to ends for cans. In this embodiment, the arrangement comprises a processing apparatus which is adapted to punch and stamp the strip to form the opening tabs. A laser unit is arranged upstream the processing apparatus and is adapted to provide markings on the strip in the marking area adjacent to the processing apparatus, such that the opening tabs after being formed in the processing apparatus have markings on a tab surface. The laser unit is supported by a supporting member which is slidable between a first position in which the laser unit is aligned with the marking area, and a second position in which the laser and supporting units are spaced from the marking area and the processing apparatus. This arrangement allows for high-precision marking, while also providing the operator immediate and complete access to the processing apparatus and the laser unit for maintenance or the like. Preferably, the laser unit is adapted to engrave the markings in the strip surface. Such an engraving operation provides for permanence of the markings, high throughput, high precision in position and layout of the markings, as well as flexibility in the layout and position of the markings on the strip.

BRIEF DESCRIPTION OF THE DRAWINGS

A presently preferred embodiment of the invention will now be described in more detail, reference being made to the accompanying schematic drawings.

DESCRIPTION OF PREFERRED EMBODIMENTS

Figure 1:
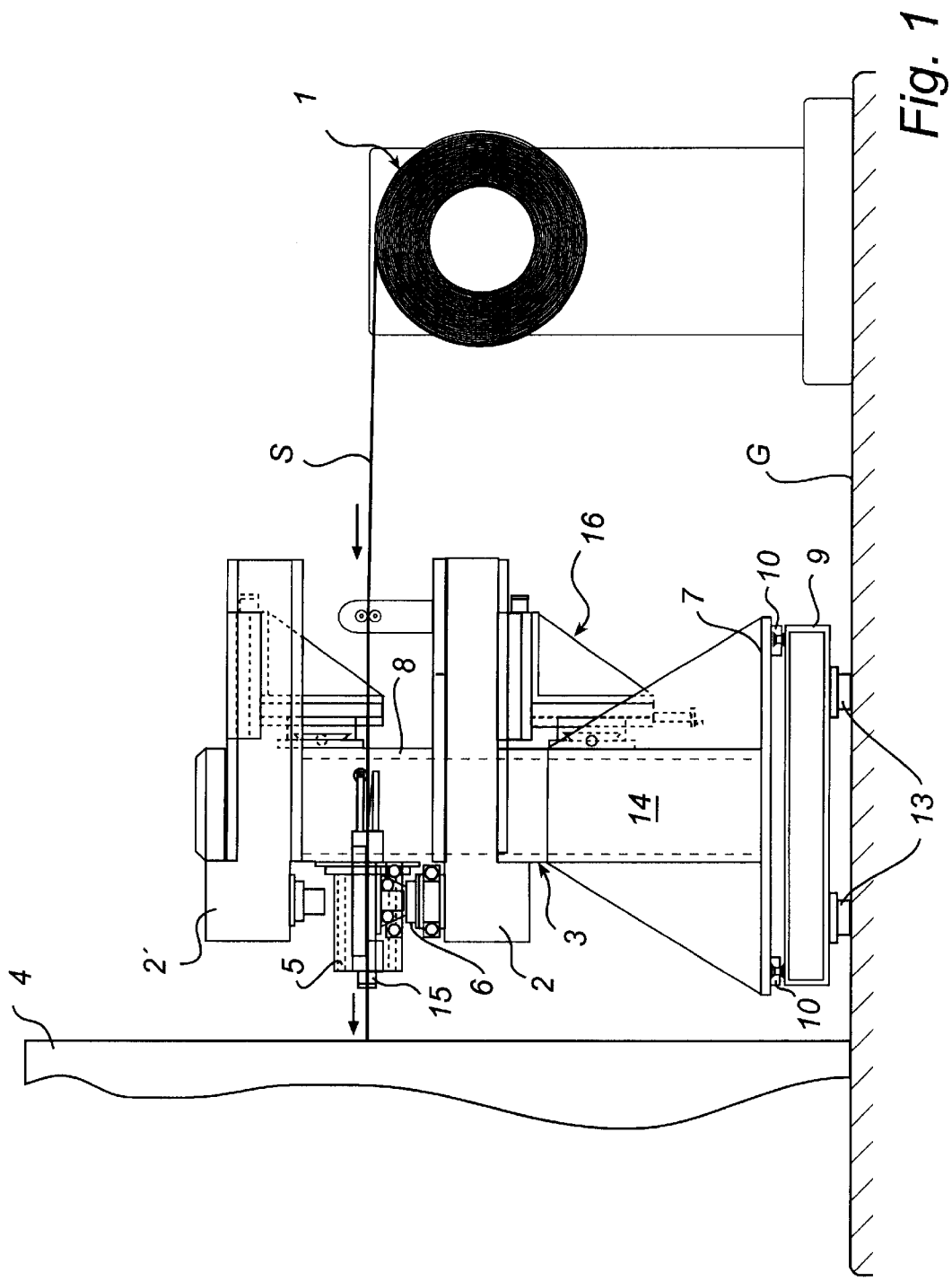
FIG. 1 is a side view of an arrangement according to an embodiment of the invention.
Figure 2A:
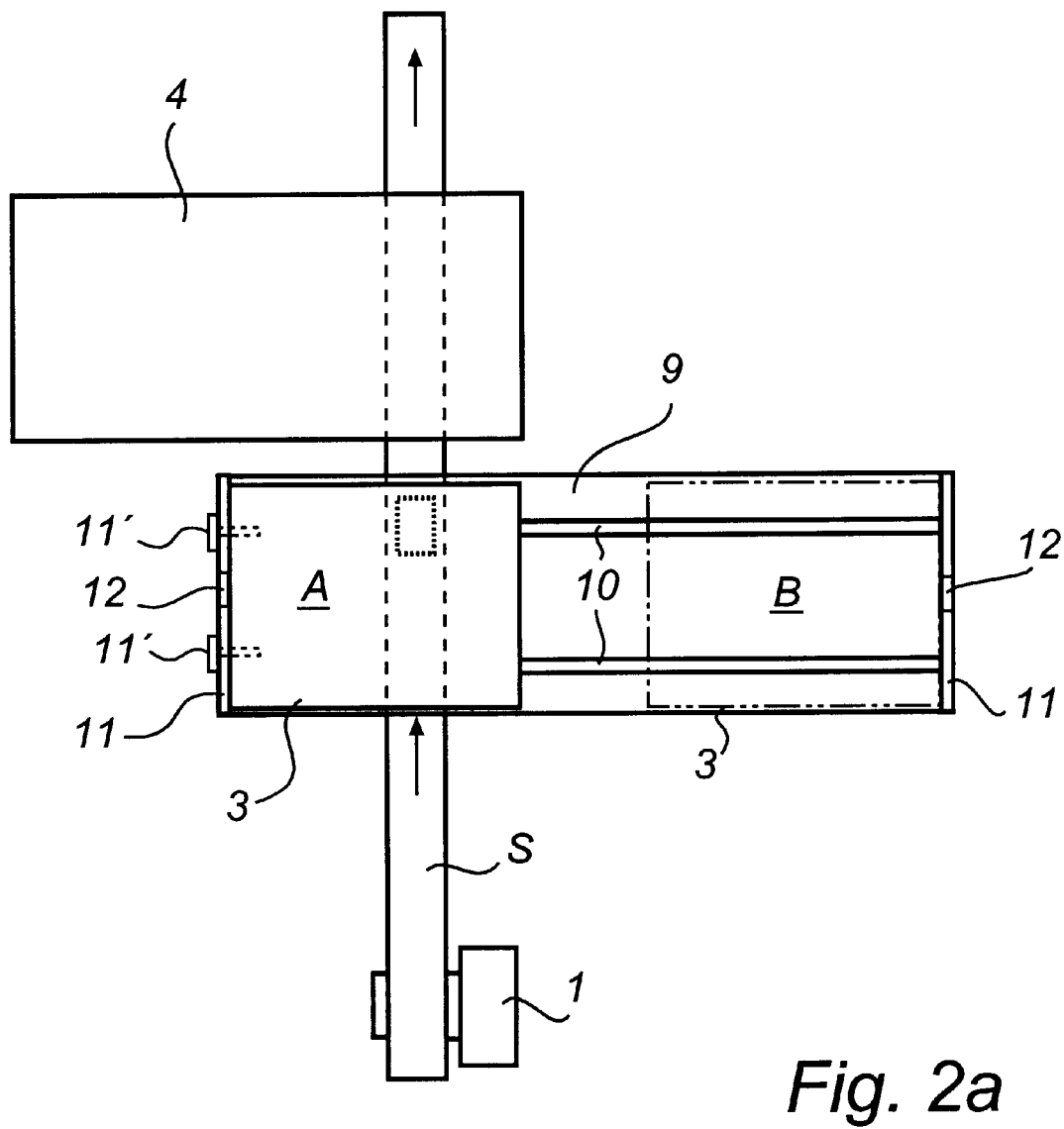
FIG. 2a is a top view of the arrangement in FIG. 1.
Figure 2B:
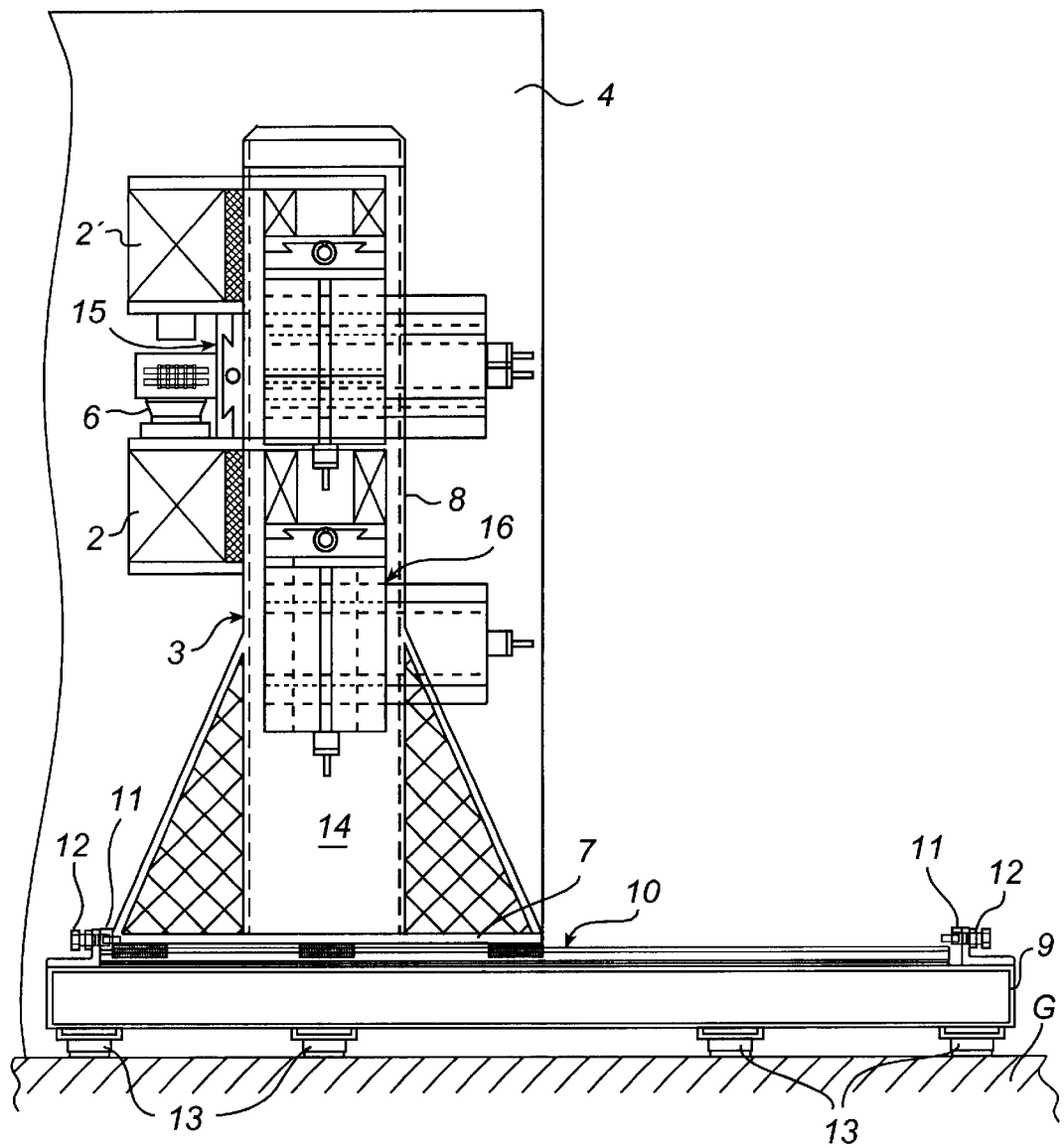
FIG. 2b is an end view of the arrangement in FIG. 1 taken in the feeding direction of the strip towards the supporting member and the processing apparatus.

FIG. 1 shows part of an arrangement for manufacture of marked tabs or opening rings to be included in ends for beverage cans (not shown). A blank in the form of a thin, continuous metal strip S is fed from a supply 1 to a laser unit 2 supported by a supporting member 3. The laser unit 2 is of a high-power and high-speed type and is capable of providing engravings or markings in the surface of the strip S. The laser unit 2 is adapted to generate laser radiation at a suitable wavelength, and to focus and direct the generated radiation to an engraving area (indicated with dotted, thick lines in FIG. 2a) on the surface of the strip S. After the engraving operation in the engraving area, the strip S is fed to an adjacent tab forming apparatus 4 which is of a type known per se and which forms tabs by punching and stamping the strip S (see for instance the pamphlet "This is PLM Fosie" issued by Applicant's company PLM Fosie AB in the mid nineties). When passing the laser unit 2, the strip S is guided by a guiding unit 5 secured to the supporting member 3. Further, a dust protection device 6 is connected to the laser unit 2 to protect the laser unit 2 from dust or debris produced during the engraving operation.

In the embodiment shown in FIG. 1, the arrangement includes a second laser unit 2' which is arranged opposite to the laser unit 2 and is adapted to provide markings on an opposite side of the strip S. The following description of the laser unit 2, and its connection to the supporting member 3, is equally applicable to the second laser unit 2' and will therefore not be repeated.

The supporting member 3 comprises a horisontally extending base portion 7 and a vertical column 8, to which the laser unit 2 and the guiding unit 5 are connected. A foundation 9 is secured to the ground G, for example by means of bolts or the like (not shown). The base portion 7 is connected to the foundation 9 by means of cooperating elongate elements forming a rail-like structure 10, so that the supporting member 3 is slidable with minimum friction between two limiting positions A, B. These limiting positions are, as indicated in the top view of FIG. 2a; an operating position A in which the laser unit 2 (not shown in FIG. 2a) is aligned with the engraving area adjacent to the tab forming apparatus 4; and a maintenance position B in which the laser unit 2 as well as the supporting member 3 are arranged at a distance from the engraving area and the tab forming apparatus 4, so as to provide an operator complete access to the laser unit 2 as well as to the tab forming apparatus 4. The rail-like structure 10 will guide the supporting unit 3 in a controlled path between the operating and maintenance positions A, B, and allows for displacement of the supporting unit 3, if desired by hand, even when carrying a heavy load. To this end, it is preferred that the rail-like structure is formed by two parallel linear bearings.

In the illustrated embodiment, the supporting unit 3 and the associated equipment weighs at least 900 kg.

Each limiting position A, B is defined by the base portion 7 engaging a stop plate 11 (not shown in FIG. 1) which projects above the foundation 9 at a respective end thereof. The operator can lock the supporting member 3 in the operating position A by engaging screws 11' with the base portion 7 via through-holes (not shown) in the associated stop plate 11. Although not shown, the associated stop plate 11 and the base portion 7 could have cooperating elements, such as a V-shaped block and a correspondingly V-shaped recess, to accurately locate the supporting member 3 in the desired operating position A. Preferably, the supporting member 3 can be returned to the operating position A with an accuracy of at least 0,1 mm.

A hydraulic shock absorber 12 is mounted on the stop plate 11 and provided to suitably decelerate the supporting member 3 before it engages with the stop plate 11 at the limiting positions A, B, to eliminate any undesired thrusts in the supporting member 3 on reaching the limiting positions A, B.

Since the tab forming apparatus 4 operates by stamping and punching the strip S, it will generate significant vibrations, often of relatively low frequency. If such vibrations were transmitted from the tab forming apparatus 4 to the supporting member 3 they might lead to undesired variations or changes in the position or alignment of the laser unit 2, the guiding unit 3, or any other associated equipment. To attenuate any such vibrations, the foundation 9 includes a vibration isolator 13, preferably of the type used in for example industrial measuring equipment. Further, the supporting member 3 is at least partly hollow and defines an interior space 14. By filling this space to a given degree by a filler material, for example metal balls, the eigenfrequencies of the supporting member 3 and the associated equipment can be adjusted away from the major frequencies of the vibrations generated by the tab forming apparatus 4.

The tab surface available for the markings is very small. Therefore, the laser radiation must be accurately positioned on the strip S, and the strip S must be also be accurately positioned during the laser engraving operation. Consequently, the laser unit 2 and the guiding unit 5 must be accurately positioned with respect to the engraving area adjacent to the tab forming apparatus 4. To this end, there is provided for fine adjustment in the position of these units 2, 5.

The guiding unit 5 is connected to the vertical column 8 via a two-dimensional positioner 15, which allows for fine adjustment of the local position of the guiding unit 5 in two orthogonal directions in the plane of the strip S. Thereby, the guiding unit 5 can be brought into perfect alignment with the tab forming apparatus 4, to minimize the forces acting on the strip S. Any slight mutual misalignment of the guiding unit 5 and the tab forming apparatus 4, especially in the lateral direction of the strip S, might bring about jamming, or even deformation, of the strip S. In an alternative embodiment, not shown, the positioner 15 provides for adjustment of the guiding unit 5 also in the vertical direction, to compensate for any settlement in the supporting member 3 or foundation 9.

The laser unit 2 is connected to the vertical column 8 via a three-dimensional positioner 16, which allows for fine adjustment of the local position of the laser unit 2 in the lateral and longitudinal directions of the strip S as well as in the vertical direction. The adjustment in the vertical direction allows the focal region of the laser unit 2 to be brought on a level with the engraving area, i.e. the surface of the strip S.

For acceptable results in the illustrated arrangement for marking and shaping opening tabs, the position of the laser unit 2 and the guiding unit 5 should be adjustable relative to the supporting member 3 with an accuracy of at least 0,02 mm, preferably at least 0,01 mm.

Figure 3:
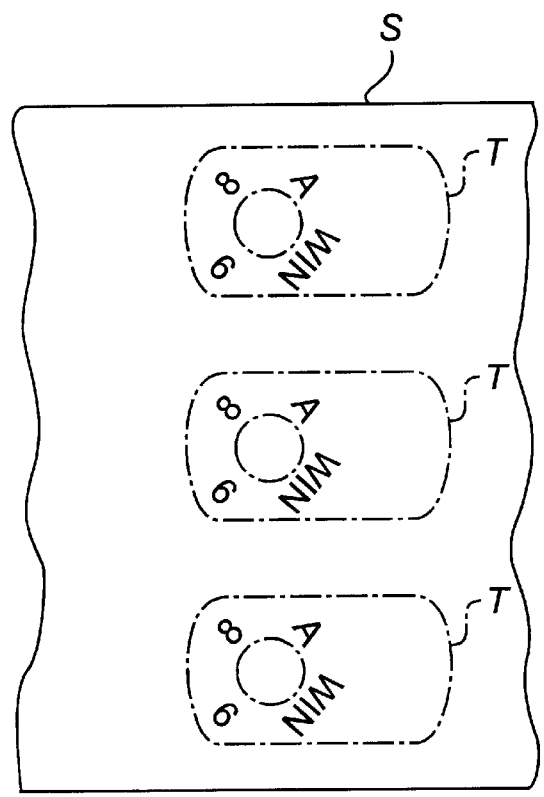
FIG. 3 is a plan view of a portion of a metal strip provided with indicative markings.
Figure 4:
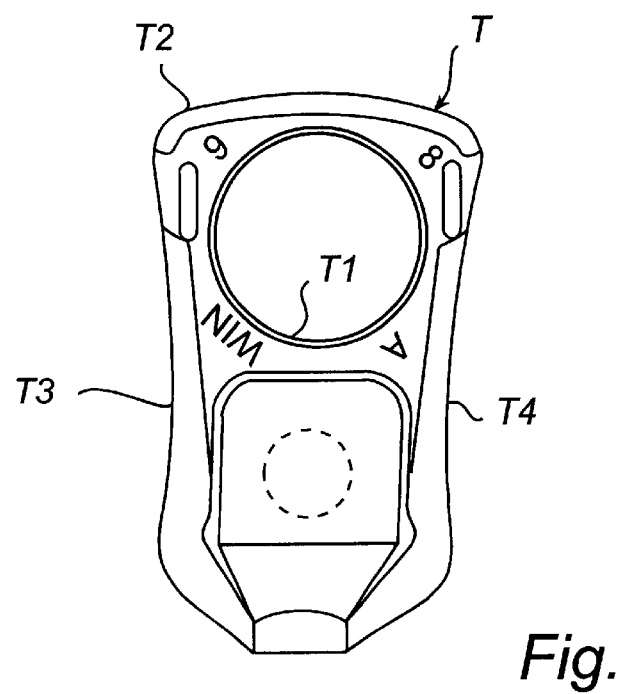
FIG. 4 is a bottom view of a tab having markings on its bottom surface.

FIG. 3 shows a portion of the strip S after the laser engraving operation at the laser unit 2, but before the punching and stamping operation in the tab forming apparatus 4. The laser unit 2 has provided the engraved markings WIN, A, 8, 9 on one surface of the strip S. The approximate periphery of the tab T to be produced in the following tab forming steps in the apparatus 4 has been indicated with ghost lines in FIG. 3. In practice, the size of the laser engraved markings is about 1.4×1.2 mm which makes them easily readable. In FIG. 4, the final tab T is shown from below after processing in the tab forming apparatus 4. The markings WIN, A, 9, 8 are now precisely located on a respective tab surface, in this case intermediate an opening T1 and peripheral edge portions T2, T3, T4 of the tab T.

It should be appreciated that the movement of the supporting unit 3 and/or the positioners 15, 16 could be electrically controlled, by means of electric motors or stepper motors (not shown), and that the supporting unit 3 could be secured in the operating position A by, for example, electromagnetic attraction.

Although the invention is described in connection to laser engraving equipment, it may also be applicable in connection with equipment for any other type of non-mechanical marking of a target, such as ink jet printing.

What is claimed is:

1. An arrangement for shaping and marking a target comprising:
    a processing apparatus that is configured to mechanically shape said target;
    a marking unit that is configured to non-mechanically provide markings on said target in a marking area adjacent to said processing apparatus; and
    a supporting unit that supports said marking unit,
    wherein said supporting unit is slidable between a first position in which said marking unit is aligned with said marking area, and a second position in which said marking and supporting units are spaced from said marking area and said processing apparatus.

2. An arrangement as set forth in claim 1, further comprising a foundation that is configured for arrangement on the ground, said supporting unit being slidably connected to said foundation using cooperating elements.

3. An arrangement as set forth in claim 2, wherein said cooperating elements include a rail structure.

4. An arrangement as set forth in claim 2, wherein each of said cooperating elements includes at least one linear bearing.

5. An arrangement as set forth in claim 1, wherein said foundation comprises a vibration isolator configured to attenuate any vibration transmitted to said foundation from said processing apparatus.

6. An arrangement as set forth in claim 1, wherein said supporting unit defines an interior space configured to receive a filler material for adjustment of at least one eigenfrequency of the supporting unit.

7. An arrangement as set forth in claim 1, further comprising a motion dampener arranged to decelerate the supporting unit at least when it is approaching said first position.

8. An arrangement as set forth in claim 1, further comprising a fastener configured to secure said supporting unit in said first position.

9. An arrangement as set forth in claim 1, wherein, in said first position of the supporting unit, said marking unit is adjustable in each of three orthogonal directions with respect to said supporting unit, one of said directions being perpendicular to said marking area.

10. An arrangement as set forth in claim 9, wherein said marking unit is adjustable with an accuracy of at least 0.02 mm.

11. An arrangement as set forth in claim 10, wherein said accuracy is at least 0.01 mm.

12. An arrangement as set forth in claim 1, further comprising a guiding unit connected to said supporting unit and arranged to guide the target through said marking area in a feeding direction of said processing apparatus.

13. An arrangement as set forth in claim 12, wherein, in said first position of said supporting unit, said guiding unit is adjustable at least in one direction perpendicular to said feeding direction, such that lateral forces on the target is minimized.

14. An arrangement as set forth in claim 13, wherein said guiding unit is adjustable with an accuracy of at least 0.02 mm.

15. An arrangement as set forth in claim 14, wherein said accuracy is at least 0.01 mm.

16. An arrangement as set forth in claim 1, wherein said marking unit comprises a laser unit configured to generate laser radiation and direct and focus said laser radiation onto the target in said marking area.

17. An arrangement as set forth in claim 1, wherein said target is a continuous strip of metal.

18. An arrangement as set forth in claim 17, wherein said processing apparatus is arranged to receive said strip from said marking area and wherein said processing apparatus is adapted to punch and stamp said strip, thereby forming opening tabs to be attached to ends for cans, said tabs being provided with markings on a tab surface.

19. An arrangement as set forth in claim 1, wherein said processing apparatus is arranged to receive said target from said marking area.

20. An arrangement for manufacturing opening tabs to be attached to ends for cans by shaping and marking a continuous strip of metal, comprising:
   a processing apparatus that is configured to punch and stamp said strip to form said opening tabs;
   a laser unit that is arranged upstream of said processing apparatus and arranged to provide markings on said strip in a marking area adjacent to said processing apparatus such that said opening tabs after being formed in said processing apparatus have markings on a tab surface; and
   a supporting unit that supports said laser unit,
   wherein said supporting unit is slidable between a first position in which said laser unit is aligned with said marking area, and a second position in which said laser and supporting units are spaced from said marking area and said processing apparatus.

* * * * *

UNITED STATES PATENT AND TRADEMARK OFFICE
CERTIFICATE OF CORRECTION

PATENT NO. : 6,455,806 B1
DATED : September 24, 2002
INVENTOR(S) : Jendick

It is certified that error appears in the above-identified patent and that said Letters Patent is hereby corrected as shown below:

<u>Column 3,</u>
Line 52, should read -- guiding unit 5 -- rather than "guiding unit 3".

<u>Column 5,</u>
Line 13, should read -- claim 2 -- rather than "claim 1".

Signed and Sealed this

Eighteenth Day of February, 2003

JAMES E. ROGAN
*Director of the United States Patent and Trademark Office*